US012375945B2

(12) United States Patent
Brown et al.

(10) Patent No.: US 12,375,945 B2
(45) Date of Patent: Jul. 29, 2025

(54) METHOD OF RECONFIGURING A TELECOMMUNICATIONS NETWORK

(71) Applicant: BRITISH TELECOMMUNICATIONS PUBLIC LIMITED COMPANY, London (GB)

(72) Inventors: Ruth Brown, London (GB); Jonathan Hart, London (GB); Mona Ghassemian, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 394 days.

(21) Appl. No.: 17/642,765

(22) PCT Filed: Aug. 14, 2020

(86) PCT No.: PCT/EP2020/072892
§ 371 (c)(1),
(2) Date: Mar. 14, 2022

(87) PCT Pub. No.: WO2021/063584
PCT Pub. Date: Apr. 8, 2021

(65) Prior Publication Data
US 2022/0345912 A1 Oct. 27, 2022

(30) Foreign Application Priority Data
Sep. 30, 2019 (EP) .................................. 19200558

(51) Int. Cl.
H04W 24/02 (2009.01)
H04W 28/16 (2009.01)
(Continued)

(52) U.S. Cl.
CPC ........... *H04W 24/02* (2013.01); *H04W 28/16* (2013.01); *H04W 40/18* (2013.01); *H04W 64/00* (2013.01)

(58) Field of Classification Search
CPC ..... H04W 24/00; H04W 24/02; H04W 64/00; H04W 64/003; H04W 28/00;
(Continued)

(56) References Cited

U.S. PATENT DOCUMENTS 9,501,946 B1 * 11/2016 Kulkarni ................ G09B 23/30
10,264,461 B2 4/2019 Aijaz
(Continued)

FOREIGN PATENT DOCUMENTS

WO WO-2014055329 A1 * 4/2014 ......... H04L 12/6418
WO 2017/175027 10/2017
(Continued)

OTHER PUBLICATIONS

Jun He and Wei Song; "AppRAN: Application-Oriented Radio Access Network Sharing in Mobile Networks"; IEEE ICC 2015—Mobile and Wireless Networking Symposium (7 pages).
(Continued)

*Primary Examiner* — Warner Wong
(74) *Attorney, Agent, or Firm* — Nixon & Vanderhye P.C.

(57) ABSTRACT

A method (200) of reconfiguring a telecommunications network (100), the telecommunications network being configured to facilitate telehaptic communication with a User Equipment (UE) (110), the method comprising the steps of: processing a network communication so as to determine a likelihood of future telehaptic communication with the UE (230); determining that said likelihood of future telehaptic communication exceeds a threshold value (240); and in
(Continued)

response to said determining, reconfiguring the telecommunications network so as to improve network performance for the UE (250).

21 Claims, 3 Drawing Sheets

(51) Int. Cl.
*H04W 40/18* (2009.01)
*H04W 64/00* (2009.01)

(58) Field of Classification Search
CPC ..... H04W 28/16; H04W 40/00; H04W 40/18; H04L 41/147; H04L 4/50
See application file for complete search history.

(56) References Cited

U.S. PATENT DOCUMENTS

| | | | | |
|---|---|---|---|---|
| 11,392,194 | B1* | 7/2022 | Kundra | H04L 65/1069 |
| 2003/0058216 | A1* | 3/2003 | Lacroix | G06F 3/016 |
| | | | | 345/156 |
| 2007/0149184 | A1* | 6/2007 | Viegers | G08G 1/20 |
| | | | | 701/519 |
| 2009/0096632 | A1* | 4/2009 | Ullrich | H04N 21/81 |
| | | | | 340/407.1 |
| 2017/0123824 | A1* | 5/2017 | Franck | G06F 9/453 |
| 2017/0367036 | A1* | 12/2017 | Chen | H04L 41/122 |
| 2018/0249530 | A1 | 8/2018 | Salkintzis | |
| 2018/0324099 | A1 | 11/2018 | Onishi | |

FOREIGN PATENT DOCUMENTS

| | | | | |
|---|---|---|---|---|
| WO | 2019/081039 | | 5/2019 | |
| WO | WO-2019134489 | A1* | 7/2019 | ......... H04L 41/0893 |
| WO | 2019/167474 | | 9/2019 | |

OTHER PUBLICATIONS

Communication pursuant to Article 94(3) EFC dated Jun. 22, 2023, issued for European Application No. 20 753 781.2 (8 pages).
The International Search Report and the Written Opinion of the International Searching Authority dated Sep. 15, 2020, in connection with corresponding International Application No. PCT/EP2020/072892 (13 pages).
Extended European Search Report dated Feb. 19, 2020, including the European Search Report and the European Search Opinion, in connection with corresponding EP Application No. 19200558.5 (9 pages).
GB Search Report dated Feb. 20, 2020, in connection with corresponding GB Application No. 1914065.6 (8 pages).
CATT; 3GPP Draft, S2-186908 "Solution for optimizing connection management based on NWDAF output"; Jul. 1, 2018. CATT. XP051470047. (3 pages).
Sachs, J. et al., "Adaptive 5G Low-Latency Communication for Tactile Internet Services". Proceedings of the IEEE. Feb. 2019. vol. 107, No. 2., pp. 325-349 (25 pages).
Zhang, Q. et al.; "Towards 5G Enabled Tactile Robotic Telesurgery"; Mar. 9, 2018. arXiv preprint arXiv:1803.03586 (7 pages).
Ericsson; 3GPP Draft, RP-162445; ""WI on critical communication in LTE""; Nov. 30, 2016; XP051665073 (7 pages).
Wong, E. et al.: "Predictive Resource allocation for Tactile Internet Capable Passive Optical LANs", Journal of Lightwave Technology, IEEE. Jul. 1, 2017., vol. 35, No. 13., pp. 2629-2641, XP011650425, ISSN: 0733-8724, D011: 10.1109/JLT.2017.2654365 (13 pages) p. 2631, left column first complete paragraph; p. 2633, section A. Bayesian Estimation for Poisson-distributed Tactile Internet Traffic.
Gokhale, V. et al., "Teleoperation over a Shared Network: When Does it Work?" Indian Institute of Technology and University of South Bohemia. (6 pages).
Ito, M. "Service-specific Mobile Network Virtualization Technologies" Journal of the National Institute of Information and Communications Technology. 2015. vol. 62, No. 2, pp. 63-72. (10 pages).
He, J. et al., "appRAN: Application-oriented radio access network sharing in mobile networks" IEEE International Conference on Communications. 2015. (3 pages).
International Preliminary Report on Patentability for PCT/EP2020/072892 dated Apr. 14, 2022 (9 pages).

* cited by examiner

METHOD OF RECONFIGURING A TELECOMMUNICATIONS NETWORK

This application is the U.S. national phase of International Application No. PCT/EP2020/072892 filed Aug. 14, 2020 which designated the U.S. and claims priority to EP 19200558.5 filed Sep. 30, 2019, the entire contents of each of which are hereby incorporated by reference.

FIELD OF INVENTION

The present invention relates to a method of reconfiguring a telecommunications network, and in particular so as to facilitate telehaptic communication over the telecommunications network.

BACKGROUND

Telehaptics is the use of a telecommunications network to communicate (to an appropriate apparatus) tactile sensations to a remote user or multiple remote users.

Due to humans' sensitivity to asynchronicity between visual or aural inputs versus physical stimuli, effective telehaptics requires relatively very low latencies for the full duration of telehaptic events. Very low latency performance requires significant network resources. However, telehaptic events might only form a small portion of an overall network session. Accordingly, inefficient use of network resources may arise when providing an effective standard of network performance for telehaptic communication.

It is an aim of the present invention to at least alleviate, at least, the aforementioned problem.

STATEMENTS OF INVENTION

According to a first aspect of the present invention, there is provided: a method of reconfiguring a telecommunications network, the telecommunications network being configured to facilitate telehaptic communication with a User Equipment (UE), the method comprising the steps of: processing a network communication so as to determine a likelihood of future telehaptic communication with the UE; determining that said likelihood of future telehaptic communication exceeds a threshold value; and in response to said determining, reconfiguring the telecommunications network so as to improve network performance for the UE.

Preferably, the telecommunications network is reconfigured specifically for the UE, and more preferably to the exclusion of further UEs that may be accessing the telecommunications network.

Preferably, the network communication is processed so as to identify a network address of the network communication, and wherein the likelihood is determined in dependence upon said network address.

Preferably, the likelihood is increased if the network address corresponds to a network address that is predetermined to be indicative of a telehaptic device or network resource. Optionally, the network address is a MAC, IP and/or TCP address.

Preferably, the network communication is processed so as to identify a geographic location of the UE, and wherein the likelihood is determined in dependence upon said geographic location.

Optionally, the network communication is processed so as to identify a geographic location of a network resource with which the UE is communicating. Preferably, the likelihood is increased if the location of the UE and/or of the network resource is in a location that is predetermined to be indicative of a location in which telehaptic communications are performed. For example, the location may correspond to an office or a hospital. Optionally, the determined likelihood is increased if the location of the UE and the location of the network resource with which the UE is communicating are within a threshold proximity.

Preferably, the network communication is processed so as to inspect payload data of the network communication, and wherein the likelihood is determined in dependence upon said payload data.

Optionally, the determined likelihood is increased if the inspected payload data contains data that is predetermined to be indicative of pre-empting a telehaptic network communication. For example, the payload data may be: audio data; visual data (e.g. a video or image); and/or textual data.

Optionally, the payload data that is indicative of pre-empting telehaptic communications may include: a gesture, and in particular a greeting or gesticulated salutation; a verbal or textual salutation; and/or an instruction so as to cause an instruction, such as to cause a telehaptic device to perform a telehaptic action.

Preferably, the network communication is processed so as to identify a time associated with the communication of the network communication. Optionally, the time is: an absolute time; time of day; day of the week; and/or time elapsed since a previous telehaptic network communication with the UE.

Preferably, the determined likelihood is increased if the network communication is communicated at a time that is predetermined to be indicative of a time at which telehaptic communications are performed. For example, the time may be during working hours and/or beyond a period since a previous telehaptic network communication with the UE.

Preferably, the method further comprises the step of processing a sensor reading from the UE so as to determine a likelihood of a future telehaptic communication with the UE.

Preferably, the method further comprises the step of processing a sensor reading from a network device with which the UE is communicating so as to determine a likelihood of a future telehaptic communication with the UE. Optionally, the sensor reading is derived from: a microphone; a camera; an accelerometer; a barometer; and/or a gyroscope.

A method according to any preceding claim wherein said reconfiguring is performed so as to reduce network latency. Optionally, said reconfiguring is performed so as to reduce jitter. Preferably, said reconfiguring is performed so as to reduce end-to-end or return trip time (RTT) latency to the UE to below 10 ms, more preferably below 5 ms, still more preferably below 1 ms, yet more preferably 0.5 ms, and still more preferably 0.1 ms.

Preferably, said reconfiguring is performed so as to reduce end-to-end or return trip time (RTT) to an extent that is predetermined by the type of anticipated telehaptic network communication.

Preferably, reconfiguring the telecommunications network comprises allocating the UE to a network slice. Preferably, the UE is already allocated to a first network slice, and the reconfiguring is performed to re-allocate the UE to a second network slice having improved network performance over the first network slice for the purpose of facilitating telehaptic communication (e.g. reduced latency). Preferably, reconfiguring the telecommunications network comprises prioritising processing of a network communication to and/or from the UE and/or increasing a bandwidth allowance.

Preferably, reconfiguring the telecommunications network comprises changing a path through the telecommunications network of a network communication from and/or to the UE.

A method according to any preceding claim, wherein reconfiguring the telecommunications network comprises changing a location within the telecommunications network of a network resource to be accessed by the UE. Preferably, the location of the network resource is moved to an access point that is serving the UE.

Preferably, the method further comprises the steps of: receiving a further network communication and processing the further network communication so as to re-evaluate the likelihood of a future telehaptic communication with the UE; determining if the re-evaluated likelihood exceeds a threshold value; and reconfiguring the telecommunications network so as to reduce network performance for the UE upon determining that the re-evaluated likelihood is below the threshold value. Optionally, said processing is further performed on a sensor reading. Optionally, said further network communication is a telehaptic network communication.

Preferably, the step of determining the likelihood of a future telehaptic communication is performed so as to determine if the future telehaptic communication will occur within a predefined time period.

Preferably, wherein the predefined time period is no less than the time to effect the reconfiguring of the telecommunications network.

Preferably, the method further comprises the steps of: subsequently receiving a telehaptic network communication; recording information associated with the telehaptic communication; and at a future iteration of said method, determining a likelihood of a future telehaptic communication in dependence on said recorded information. Optionally, said recorded information includes: a network address; a type of device, including software and/or hardware versions; an identity of an application; an identity of a telecommunication protocol; a payload of a data packet, including a text string, an audio segment and/or an instruction for causing actuation of a haptic device; a geographic location; a time associated with the telehaptic network communication; and/or an identity of a user utilising the UE.

Preferably, the likelihood of a future telehaptic communication is determined from a plurality of parameters that are derived from the processing of the network communication, and wherein each parameter is weighted for the purposes of determining said likelihood.

Preferably, the weighting is determined in dependence on the recorded information associated with the telehaptic communication.

Preferably, the method further comprises the steps of: identifying at least one further UE with which the UE is communicating over the telecommunications network; and instructing reconfiguration of the telecommunications network so as to improve network performance for the identified at least one further UE upon reconfiguring the telecommunications network so as to improve network performance for the UE. Optionally, the at least one further UE is identified from a network address of the network communication.

According to another aspect of the invention, there is provided a telecommunications network for facilitating telehaptic communication with a User Equipment (UE), the telecommunications network comprising: a processor for processing a network communication being communicated with the UE, said processor being configured to: process the network communication so as to determine a likelihood of future telehaptic communication with the UE; and determine that said likelihood of future telehaptic communication exceeds a threshold value; and a controller for reconfiguring the telecommunications network so as to improve network performance for the UE in response to said determining.

Preferably, the processor and/or controller is arranged within the telecommunications network (and may in particular be located in a core of the network or a Radio Access Point) and/or UE.

Preferably, the telecommunications network comprises: a cellular wide area network; a wireless local area network; a satellite network; a public network; and/or a private network.

According to yet another aspect of the invention, there is provided a computer-readable storage medium comprising instructions that, when executed by a processor associated with a telecommunications network, causes the telecommunication network to perform the method described above.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory. Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

BRIEF DESCRIPTION OF DRAWINGS

The invention extends to a method of reconfiguring a telecommunications network and to a telecommunications network substantially as described herein and/or substantially as illustrated in the accompanying drawings. The present invention is now described, purely by way of example, with reference to the accompanying diagrammatic drawings, in which.

SPECIFIC DESCRIPTION

Figure 1:
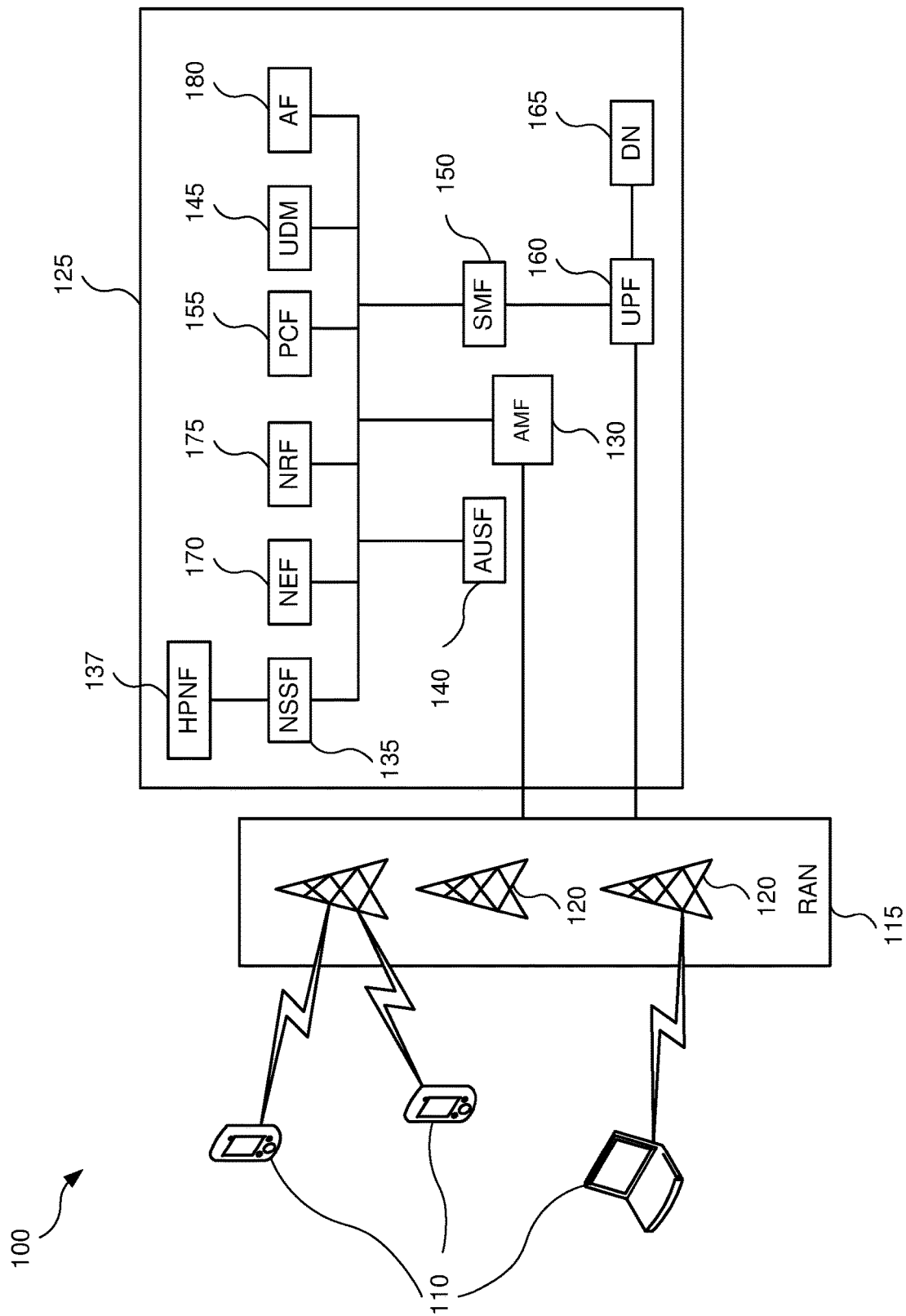
FIG. 1 shows an exemplary telecommunications network.

FIG. 1 shows an exemplary telecommunication network 100. The network 100 is a mobile cellular network comprising a plurality of User Equipment (UE) 110 (e.g. in the form of a mobile cellular device, laptop or tablet). Each UE 110 is configured to utilise the telecommunications network 100 by accessing a Radio Access Network (RAN) 115, as provided by a RAN access point 120 (e.g. in the form of a macro-, micro-, pico- or femto-cell site). In turn, the RAN access point 120 is connected to a core of the network 125.

In one example, the UE is a communication device that has telehaptic-capabilities and/or that is in turn associated with a peripheral haptic device. For example, the UE, or its associated haptic device, is a device for causing physical interaction with a subject (such as a 'telesurgery', 'teleoperation', 'telerehabilitation' or 'telepresence' robot or device). The device therefore comprises a: motor; actuator; heater; cooler; electrical generator; fan; compressor; and/or speaker (e.g. an ultrasound generator).

The core network 125 comprises the following functional components:
Access and Mobility management Function (AMF) 130;
Network Slice Selection Function (NSSF) 135;
Haptic Prediction Network Function (HPNF) 137;
AUthentication Server Function (AUSF) 140;
Unified Data Management (UDM) 145;
Session Management Function (SMF) 150;
Policy Control function (PCF) 155;
User Plane Function (UPF) 160;
Data Network (DN) 165;
Network Exposure Function (NEF) 170;
Network Repository Function (NRF) 175; and
Application Function (AF) 180.

Figure 2:
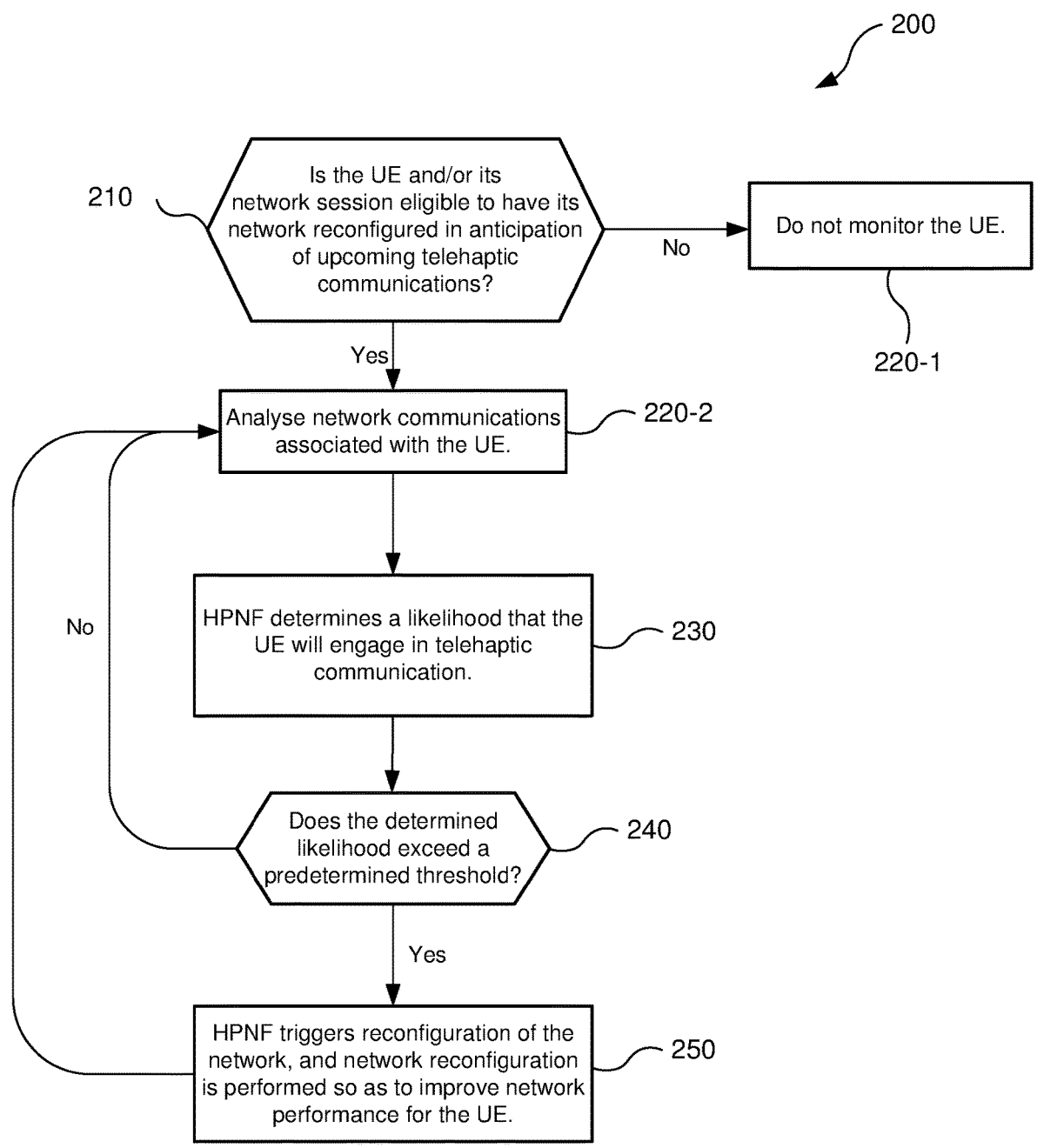
FIG. 2 shows a process for configuring the telecommunications network for telehaptic communications.

By means of the aforementioned functional components, the network 100 is configured to anticipate future telehaptic communication with the UE 110 and then to reconfigure the telecommunications network so as to improve network performance for the UE 110, in advance of the anticipated telehaptic communication, for the period in which such telehaptic communication occurs; FIG. 2 illustrates a process 200 performed by the telecommunications network to this end.

In a first step 210, the network identifies whether a UE 110 and/or its network session (including the application causing network communication) is eligible to have its network reconfigured in response to the network anticipating telehaptic communications; this is, for example, identified by way of a flag that is communicated to the network by the UE 110 when it attaches to the network or that is stored within the core network against a specific UE.

If the UE is not eligible, then process 200 ceases. If, however, the UE is identified as being eligible, then, at a next step 220-2, the network 100, and in particular the core network 125, analyses network communications associated with the UE (i.e. incoming and/or outgoing network communications). Such analysing is performed by the HPNF 137 so as to determine a likelihood that a telehaptic communication for a given UE will occur.

In particular the analysis that is performed at step 230 is performed upon parameters including:
data within a network communication to and/or from the UE, including:
a network address, such as an IP, a TCP and/or a MAC address, in particular to:
identify a type and/or identity of the UE and/or network services being accessed by the UE, and in particular whether the UE or network service is for telehaptic communication; and/or
an identity of a user operating the UE, for example by identifying a user account associated with a network session;
payload data of the network communication, including:
text or audio data, such as a phrase or word associated with telehaptic interaction (e.g. the word "hello" or phrase "nice to meet you" during a telepresence session, which may suggest a telehaptic handshake or hug);
video data, such as an action or gesture (e.g. extension of a hand to indicate a handshake); and/or
an instruction, such as to cause a telehaptic device to perform a telehaptic action;
sensor and/or contextual information of a network information, including:
a time of day of the network communication;
time elapsed between the network communication and, if applicable, the UE's last telehaptic communication;
a sensor reading, such as readings from the UE, or an associated device, from a sensor, including: a microphone; a camera; a pressure, contact or force sensor; an accelerometer; a barometer; and/or a gyroscope; and/or
an absolute geographic location of the UE and/or a relative location of the UE to a telehaptic device with which the UE is communicating.

Accordingly, having performed the analysis, the HPNF outputs a probability that a telehaptic communication for a given UE will occur within a given time frame. At a next step 240, an assessment is made (also by the HPNF) whether the probability exceeds a threshold (e.g. that there is at least a 70% chance that a telehaptic communication will occur within, for example, 5 minutes). If the probability is determined to be below the threshold then the process reverts back to step 220-2.

If, however, the probability exceeds the threshold, then the process continues to step 250. At step 250, the HPNF causes the network to reconfigure so as to improve network performance for the UE in anticipation of a telehaptic communication.

In order to ensure that the network is not unnecessarily consuming valuable network resources so as to facilitate improved network performance, after step 250, the process reiterates to step 220-2 after a predetermined period of time (typically, less than or equal to the time frame on which basis the probability was calculated e.g. less than or 5 minutes) to reassess the likelihood that telehaptic communication will occur, and in particular whether the reassessed likelihood still surpasses the threshold. If the likelihood does not surpass the threshold, then the HPNF causes the network to revert to its original configuration.

In one example, upon the process reiterating to step 220-2 and having received and then analysed a new network communication that is identified as a telehaptic network communication, the parameters of the telehaptic network communication and the analysis that was performed at step 230 during a previous iteration of the process is logged within a log associated with the HPNF.

By means of numerous iterations of process 200, the log is populated such that it comprises historical data as to the relationship between the analysed parameters and the occurrences of telehaptic network communications. By means of trend analysis, the log is subsequently used to by the HPNF to train and refine the analysis that is performed at step 230 in order to improve the accuracy of estimating the likelihood of future telehaptic communications.

In one example, a weighting is given to each parameter that is used for processing in step 230 to determine the likelihood of a telehaptic network communication. The weighting is derived based on its assessed efficacy in predicting telehaptic communication, for example from the data stored in the log.

The step 250 of reconfiguring the network so as to improve network performance for telehaptic communication is performed typically so as to accommodate the relatively low latencies that are demanded for effective telehaptics. In particular, it is aimed to achieve roundtrip latencies of no more than 10 ms, 5 ms, 1 ms, 0.5 ms or 0.1 ms, as appropriate to the specific requirements of the telehaptic service.

In one example, the reconfiguring is performed by allocating the UE to a low-latency (or lower latency, if the UE is already allocated to a network slice) network slice, such as one dedicated to Ultra-Reliable, Low-Latency Communication (URLLC). In another example, the network slice of the UE is itself reconfigured so as to reduce its latency, for example by committing more processing resources to the network slice and/or optimising a routing path for network communications associated with the network slice of the UE.

In yet another example, the reconfiguring includes:
changing the network or a part thereof (e.g. a wireless wide area cellular network, a fixed-line network or wireless local area network) over which the UE accesses network resources;
changing the path of a network communication from and/or to a given UE 110, including re-routing network communications and/or instructing the UE to access the network via a different Radio Access Point;
changing the location, within the network 100, of a resource that the UE is accessing, for example moving resources closer to the network edge, and in particular to a RAN access point 120 used by the UE;
increasing or decreasing the priority with which a network communication associated with the UE is handled by the network; and/or
increasing or decreasing bandwidth and/or transfer speeds for a given UE (i.e. throttling).

Figure 3:
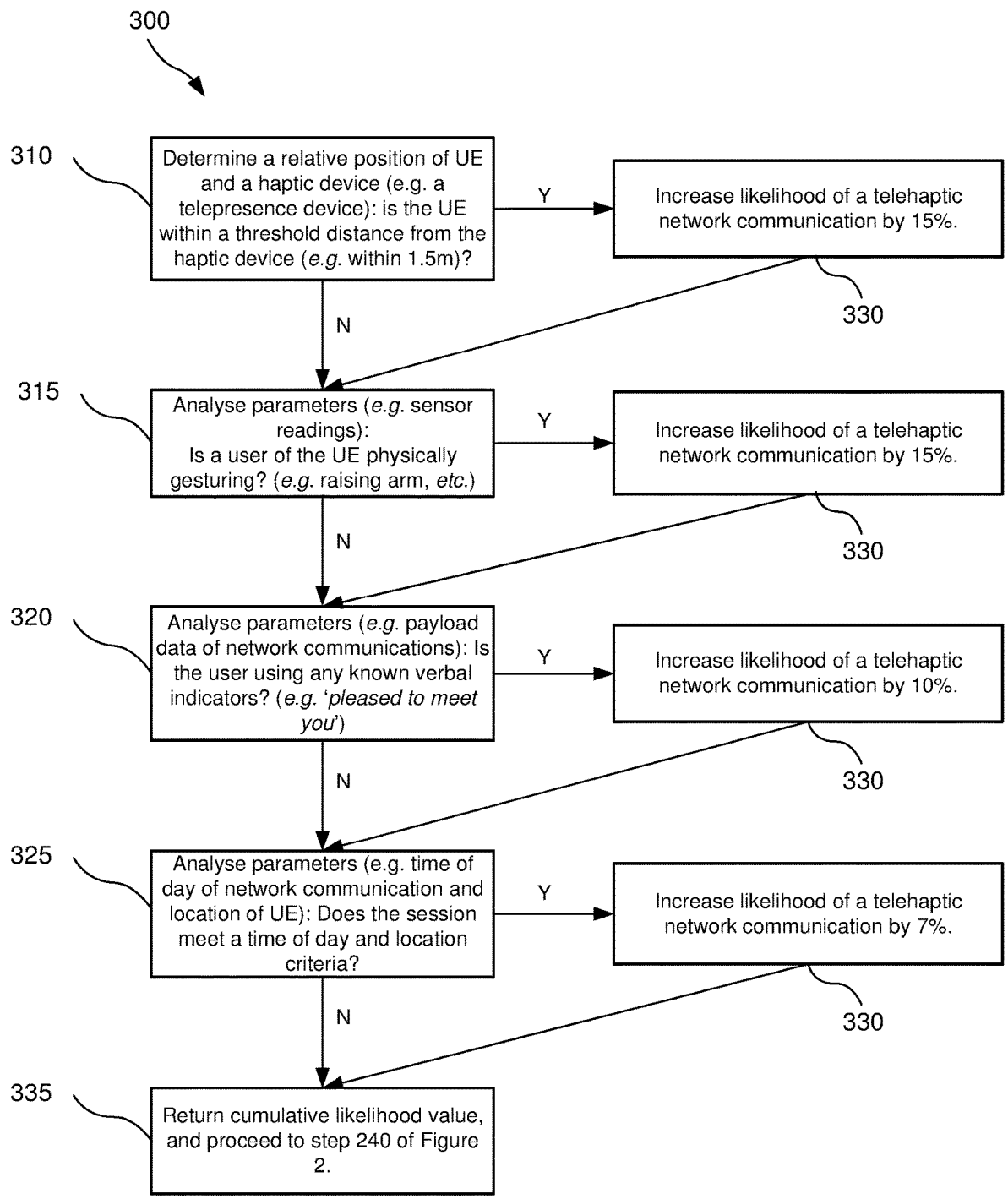
FIG. 3 shows an exemplary process for assessing a likelihood of a future telehaptic communication.

FIG. 3 shows an exemplary process by which an assessment is made as to a likelihood of a future telehaptic network communication by assessing various parameters sequentially, namely:
whether a UE and a haptic device (e.g. a telepresence device) are within a threshold distance from one another 310;
readings from sensors that may indicate gesticulation that in turn may be suggestive of an intention to cause telehaptic communication 315;
analysis of payload data from network communications as to whether they contain verbal indicators that are suggestive of an intention to cause telehaptic communication 320; and
analysis of a time of day of a network communication and the location of the UE 110, as to whether communication is being performed at a time of day and location in which telehaptic communication is likely (e.g. an office during working hours for the purposes of telepresence) 325.

The process 300 is initiated with a zero chance expectation that a telehaptic network communication will occur. Following each assessment of parameters 310, 315, 320, 325, a likelihood that a telehaptic network communication may follow is calculated based on the influence of each assessed parameter to this end 330. At a final step 335, a cumulative likelihood from each assessment 310, 315, 320, 325 is calculated (e.g. 47%); this cumulative likelihood is fed to step 240 of FIG. 2.

Alternatives and Modifications

In the aforementioned, the telecommunications network 100 is generally shown and described as a cellular wide area network in accordance with 5G technology. However, in one alternative the telecommunications network 100 is any kind of telecommunications network, including a wired network, a satellite network, a local area network, a combination of network types (so-called 'HetNets'), a public network or a private network.

In FIG. 1, the UEs 110 are shown as accessing the same core network. However, it will be appreciated that the UEs can access different core networks (and be connected to one another via interconnections between their networks).

In an alternative, the HPNF is a function that is located in the UE, rather than in the network core. In this case, the HPNF function is capable of analysing network communications before they are communicated to the network, which may afford more time for processing the communications and therefore for effecting network reconfiguration and may be capable of accessing more information than might otherwise be sent to the network, thereby permitting more parameters to be considered.

In yet another alternative, the HPNF is distributed across the UE and the telecommunications network, such that parts of the HPNF function are performed at the UE and at the network core.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of reconfiguring a telecommunications network, the telecommunications network being configured to facilitate telehaptic communication with a User Equipment (UE), the method comprising the steps of:
processing a network communication so as to determine a likelihood of future telehaptic communication with the UE;
determining that said likelihood of future telehaptic communication exceeds a threshold value; and
in response to said determining, reconfiguring the telecommunications network so as to improve network performance for the UE;

wherein the likelihood of a future telehaptic communication is determined from a plurality of parameters that are derived from the processing of the network communication, and wherein each parameter is weighted for the purposes of determining said likelihood.

2. The method according to claim 1, wherein:
wherein the network communication is processed so as to inspect payload data of the network communication, and wherein the likelihood is determined in dependence upon said payload data as at least one of the plurality of parameters; and
the payload data includes text or audio data corresponding to a word or phrase associated with telehaptic interaction and/or video data corresponding to a telehaptic action or gesture.

3. The method according to claim 1, wherein the network communication is processed so as to identify a network address of the network communication, and wherein the likelihood is determined in dependence upon said network address as at least one of the plurality of parameters.

4. The method according to claim 1, wherein the network communication is processed so as to identify a geographic location of the UE, and wherein the likelihood is determined in dependence upon said geographic location as at least one of the plurality of parameters.

5. The method according to claim 1, wherein the network communication is processed so as to identify a time associated with communication of the network communication.

6. The method according to claim 1, further comprising the step of processing a sensor reading from the UE and wherein the likelihood of a future telehaptic communication with the UE is determined in dependence upon the sensor reading as at least one of the plurality of parameters.

7. The method according to claim 1, wherein said reconfiguring is performed so as to reduce network latency.

8. The method according to claim 1, wherein reconfiguring the telecommunications network comprises allocating the UE to a network slice.

9. The method according to claim 1, wherein reconfiguring the telecommunications network comprises changing a path through the telecommunications network of a network communication from and/or to the UE.

10. The method according to claim 1, wherein reconfiguring the telecommunications network comprises changing a location within the telecommunications network of a network resource to be accessed by the UE.

11. The method according to claim 1, further comprising the steps of:
receiving a further network communication and processing the further network communication so as to re-evaluate the likelihood of a future telehaptic communication with the UE;
determining if the re-evaluated likelihood exceeds a threshold value; and
reconfiguring the telecommunications network so as to reduce network performance for the UE upon determining that the re-evaluated likelihood is below the threshold value.

12. The method according to claim 1, wherein the step of determining the likelihood of a future telehaptic communication is performed so as to determine if the future telehaptic communication will occur within a predefined time period.

13. The method according to claim 12, wherein the predefined time period is no less than the time to effect the reconfiguring of the telecommunications network.

14. The method according to claim 1, further comprising the steps of:
subsequently receiving a telehaptic network communication;
recording information associated with the telehaptic communication; and
at a future iteration of said method, determining the likelihood of a future telehaptic communication in dependence on said recorded information as at least one of the plurality of parameters.

15. The method according to claim 1, further comprising the steps of:
identifying at least one further UE with which the UE is communicating over the telecommunications network; and
instructing reconfiguration of the telecommunications network so as to improve network performance for the identified at least one further UE upon reconfiguring the telecommunications network so as to improve network performance for the UE.

16. A non-transitory computer-readable storage medium comprising instructions that, when executed by a processor associated with a telecommunications network, causes the telecommunication network to perform the method according to claim 1.

17. The method according to claim 1, wherein the weighting is determined in dependence on the recorded information associated with the telehaptic communication.

18. A telecommunications network for facilitating telehaptic communication with a User Equipment (UE), the telecommunications network comprising:
a processor for processing a network communication being communicated with the UE, said processor being configured to:
process the network communication so as to determine a likelihood of future telehaptic communication with the UE; and
determine that said likelihood of future telehaptic communication exceeds a threshold value; and
a controller for reconfiguring the telecommunications network so as to improve network performance for the UE in response to said determining;
wherein the likelihood of a future telehaptic communication is determined from a plurality of parameters that are derived from the processing of the network communication, and wherein each parameter is weighted for the purposes of determining said likelihood.

19. The telecommunications network according to claim 18, wherein:
processor is configured to process the network communication so as to inspect payload data of the network communication, and wherein the likelihood is determined in dependence upon said payload data as at least one of the plurality of parameters; and
the payload data includes text or audio data corresponding to a word or phrase associated with telehaptic interaction and/or video data corresponding to a telehaptic action or gesture.

20. The telecommunications network according to claim 19, wherein the telecommunications network comprises: a cellular wide area network; a wireless local area network; a satellite network; a public network; and/or a private network.

21. The telecommunications network according to claim 18, wherein the weighting is determined in dependence on the recorded information associated with the telehaptic communication.

* * * * *